June 14, 1955 J. W. KEPHART, JR 2,710,703

KNOCK-DOWN BOX STRUCTURE

Filed April 27, 1951 7 Sheets-Sheet 1

F / G. 1.

INVENTOR.
JOHN W KEPHART, JR.
BY
Beaver & Harding
ATTORNEYS.

June 14, 1955 J. W. KEPHART, JR 2,710,703

KNOCK-DOWN BOX STRUCTURE

Filed April 27, 1951 7 Sheets-Sheet 2

INVENTOR.
JOHN W. KEPHART, JR.
BY
[signature]
ATTORNEYS.

June 14, 1955 J. W. KEPHART, JR 2,710,703

KNOCK-DOWN BOX STRUCTURE

Filed April 27, 1951. 7 Sheets-Sheet 3

INVENTOR.
JOHN W. KEPHART, JR.
BY Brown & Harding
ATTORNEYS.

INVENTOR.
JOHN W. KEPHART, JR.
BY
Bauer & Harding
ATTORNEYS.

June 14, 1955 J. W. KEPHART, JR 2,710,703

KNOCK-DOWN BOX STRUCTURE

Filed April 27, 1951 7 Sheets-Sheet 5

INVENTOR.

JOHN W. KEPHART, JR.

BY Rumen & Harding

ATTORNEYS.

INVENTOR.
JOHN W. KEPHART, JR.
BY Bauer & Harding
ATTORNEYS.

INVENTOR.
JOHN W. KEPHART, JR.
BY
[signature]
ATTORNEYS.

2,710,703
Patented June 14, 1955

2,710,703

KNOCK-DOWN BOX STRUCTURE

John W. Kephart, Jr., Merion Station, Pa.

Application April 27, 1951, Serial No. 223,267

4 Claims. (Cl. 217—12)

This invention relates to a prefabricated box or crate and, more particularly, to a knock-down type of box or crate assembly.

Heretofore it has been common practice to build a crate or box around an object to be packed. This is an expensive and time consuming operation which is generally accomplished on a shipping platform with the attendant inconvenience of cutting and storing the lumber or other packaging materials of suitable types and dimensions.

Heretofore, in some instances, prefabricated panels have been provided which are nailed together around the object to be packaged. This nailing or assembling operation involves the use of additional materials by the packer and an expenditure of considerable time and labor. For some applications prefabricated wired crates are provided. In such a crate, four sides of the crate are laid out in flat form prior to assembly. This type of crate has the disadvantage of being of limited strength and of requiring considerable storage area for a box of even moderate dimensions.

It is an object of this invention to provide a factory built prefabricated knock-down box assembly comprising six separate panel members which may be assembled into a box by the packer. These panel members may be readily produced and supplied to a packer with the cost of manufacture, shipping and storage being considerably less than that involved in ordinary box parts suitable to produce a box of similar strength and dimensions.

It is another object of this invention to provide a box of improved construction employing less material than a conventional box having the same cubic capacity and strength.

It is another object of this invention to provide a knock-down box assembly in which the six panels forming the box are so constructed as to be interlocking when the box is assembled, thereby producing a box structure which requires no nailing, strapping or other supplemental means to hold it in assembled form.

It is another object of this invention to provide a knock-down box assembly which may be partially assembled, loaded under pressure and then closed, and in which the six panels forming the box are so constructed as to be interlocking when the box is assembled, thereby producing a box structure which requires no nailing, strapping or other supplemental means to hold it in assembled form.

It is another object of this invention to provide a knock-down box assembly one side of which forms a skid or pallet adaptable for fork-lift truck handling and permitting entry by the fork-lift forks from all four of the sides of the pallet.

It is another object of this invention to provide knock-down assemblies which, upon being assembled into completed boxes, may be stacked one upon another in interlocking fashion.

It is another object of this invention to provide a knock-down box assembly which may be repeatedly assembled and disassembled.

These and other objects of the invention will become apparent from the following description when read in conjunction with the accompanying drawings, in which.

Figure 1:
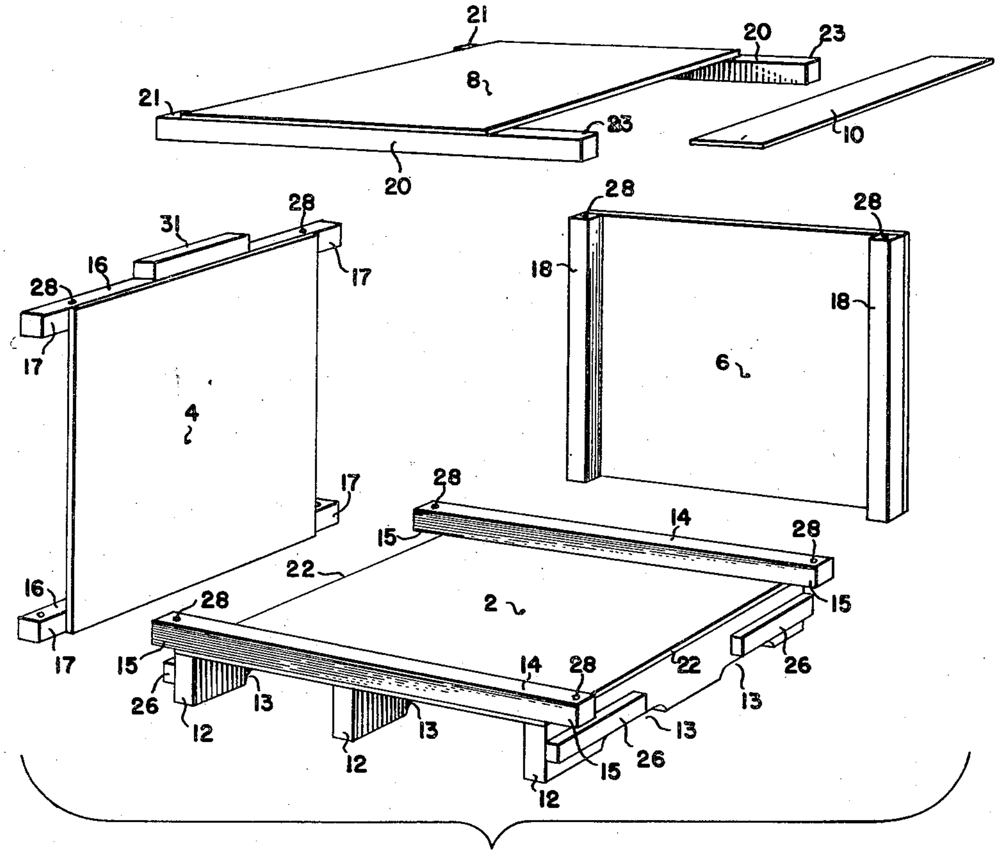
Figure 1 is an exploded view of a box incorporating one form of the present invention.
Figure 2:
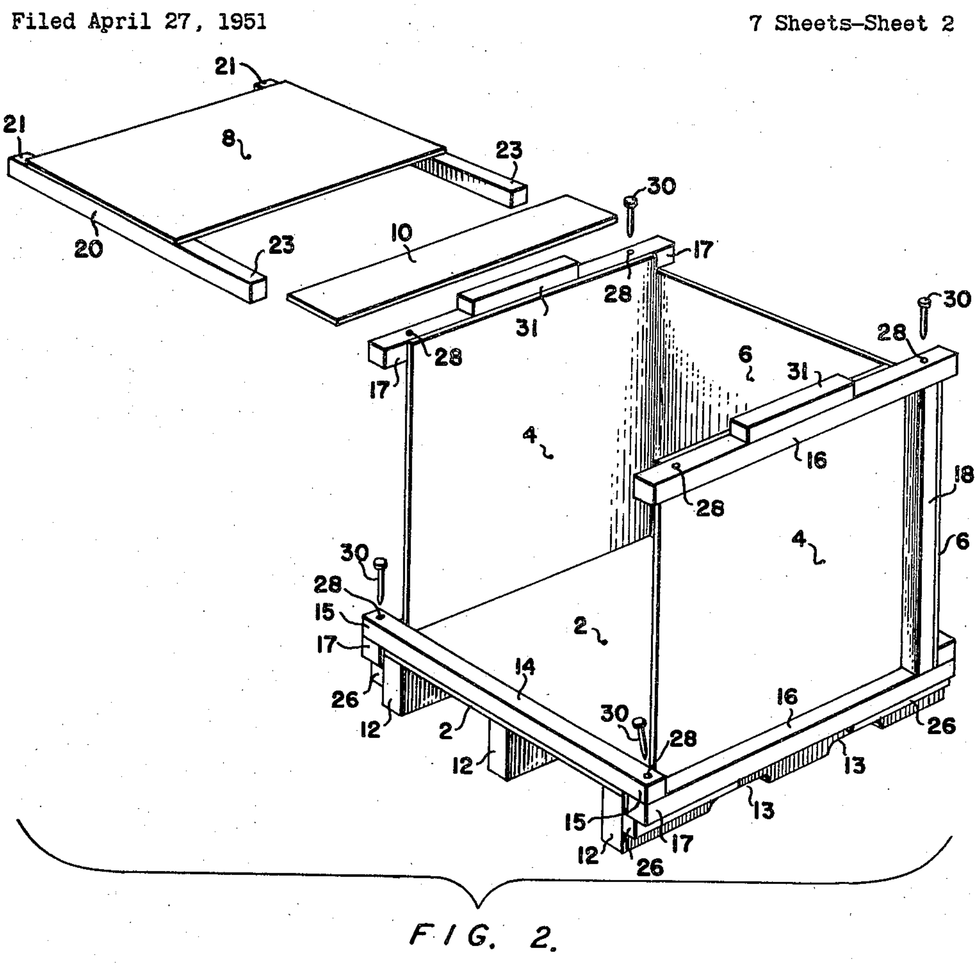
Figure 2 is a perspective view of a partly assembled box of the type shown in Figure 1.
Figure 3:
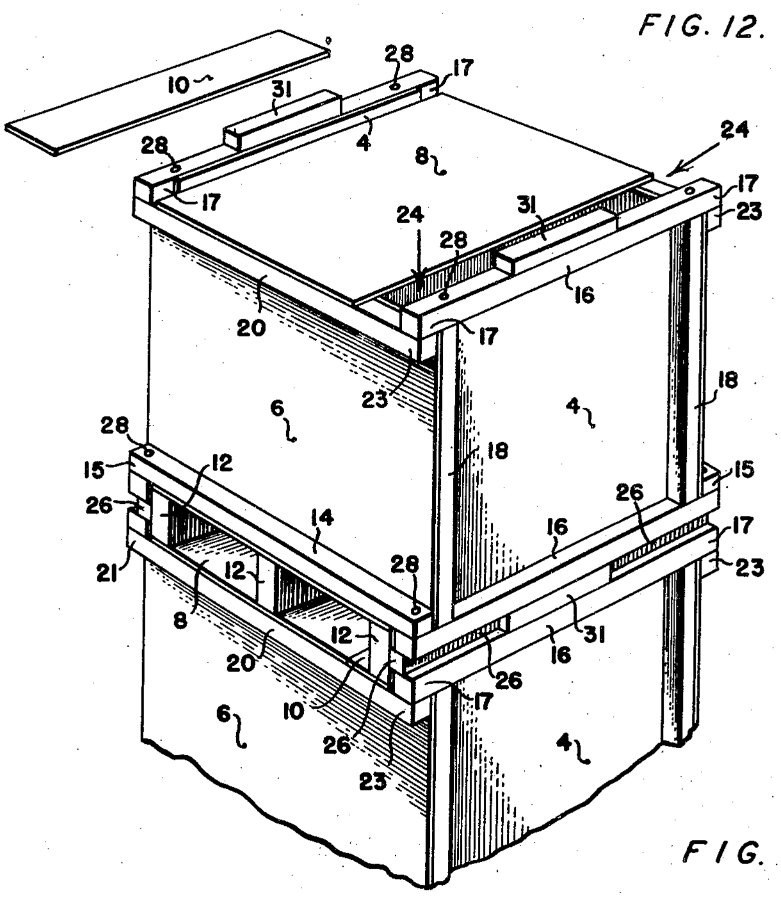
Figure 3 is a perspective view of a pair of boxes of the type shown in Figure 1 assembled and stacked one upon the other.

Referring to Figures 1, 2 and 3 there is shown a form of the invention which will be hereinafter referred to as box No. 1. This box includes six panel members, a base panel 2, two side panels 4, two end panels 6 and a top panel 8. In addition to the top panel there is provided a closing slat 10.

The base panel 2 is adapted to be mounted on and rigidly attached to runners 12. Mounted on top of the base panel 2 and attached thereto adjacent to the outer edges thereof are a pair of cleats 14. A pair of horizontally extending cleats 16 are attached to the outside of each of the side panels 4 adjacent to the upper and lower edges thereof. A pair of vertically extending cleats 18 are attached to the inside of each of the end panels 6 adjacent to the outer edges thereof. A pair of horizontally extending cleats 20 are attached to the underside of the top panel 8 adjacent to outer edges thereof. The cleats 14 have portions 15 extending beyond the edges of the base panel 2. The cleats 16 have portions 17 extending beyond the edges of the panel 4. The cleats 20 each have extending beyond the panel 8 portions 21 and 23, the portions 23 being longer than the portions 21 by at least the width of slat 10.

The portions of the box described herein as panels may be made of a sheet of wood, fiber, corrugated paper, metal other suitable material. The panel may be made of a single sheet of material as shown or, alternately, may be made of a plurality of pieces such as, for example, spaced slats. It will be evident that, when the word "panel" is used throughout this description, any of these meanings may apply.

The cleats may similarly be formed of wood, fiber, a corrugated paper or metal. The runners are generally made either of wood or of metal. When wood, corrugated paper or fiber parts are used, the panels may be attached to the cleats by nailing or stapling in automatic feed machines, thus greatly reducing the cost of assembly of the box parts. When metal parts are used, the panels and cleats may be spot welded together to form the box members or, alternately, the assembly of the panel and the cleats may be formed out of a single sheet of metal.

To assemble a box, the side panels 4 are placed against the edges 22 of the base panel 2 with the extending portion 17 of the lower horizontal cleat 16 passing below the extending portions 15 of the horizontal cleats 14. The end panels 6 are placed into position with the panels 6 inside of the horizontally extending base member cleats 14 and with the vertically extending cleats 18 of the end panels 6 outside of the edges of the side panels 4.

After the bottom, the two side and the two end panels have been thus assembled, the top panel 8 may be positioned on top of the box with its cleats 20 lying outside of the end panels 6. This is accomplished by placing the top panel 8 above the box and sliding the extended portions 23 of the top panel cleats 20 under the extended portion 17 of one of the upper cleats 16 of a side panel 4. By passing the extended portions 23 of the cleats 20 under the ends of the cleat 16, the portions 21 of the cleats 20 may be lowered down inside of the cleat 16 of the opposite side panel 4, and thereafter, by sliding the top panel 8 toward the opposite side panel 4, the extended portions 21 of the cleats 20 will pass under the extended portions 17 of the cleat 16 of that side panel.

A box with the top panel thus positioned as shown in Figure 3 is locked by inserting the closing slat 10 in the space generally indicated by the arrow 24 in Figure 3. With the top panel locked into position there is provided a self-locking box assembly. The side panels 4 are prevented from moving outwardly by the cleats 18 of the end panel 6. The side panels are prevented from moving upwardly or downwardly by the same cleats as well as by the cleats 14 and 20, and are prevented from moving to either side by the cleats 14 and 20. The end panels 6 are prevented from moving outwardly by the cleats 14 and 20. They are prevented from moving upwardly or downwardly by the top panel 8 and the bottom panel 2, and are prevented from moving to either side by engagement of panels 4 by the cleats 18. The bottom panel is held up in position in the box by the cleats 16 bearing on the undersides of the extended portions of the cleats 14. The top panel 8 is held down upon the box by the extended portions of the cleats 16 acting downwardly upon the extending portions of the cleats 20. There is thus provided a box assembly of extreme rigidity which has been assembled without the use of any fastening means other than that hereinafter described, and used only to secure the closing slat 10 in position.

This type of box construction has the advantage in that the bottom panel 2 and its associated runners 12 provide a skid or pallet which may be loaded and which may be conveniently handled by a fork-lift truck. The cut-out portions 13 of the runners 12 provide for entry by the fork-lift truck forks from any one of the four sides of the skid. After the base panel assembly or skid is loaded, the side, end and top panels may then be assembled around the base panel to form the finished self-locking box.

Alternatively, by the provision of members such as the blocks 26 which are attached to the outer surfaces of the side runners 12, and by the provision of bores 28 in the cleats, three sides of the box may be assembled, as shown in Figure 2, with pins 30 passing through the bores 28 in the cleats as shown to prevent the end panel 6 from falling outwardly and to prevent the side panels 4 from moving outwardly at their open ends. The blocks 26 attached to the outer surfaces of the outer runners 12 serve to support the lower cleats 16 of the side panels 4 to prevent the side panels from dropping downwardly at their open ends. There is thus provided in temporarily assembled form, a three sided box which may be loaded from the side and thereafter have the remaining side and top panels assembled thereto as previously described.

The holes 28 in the upper cleats 16 may be positioned so that the pins 30 enter holes in the upper ends of the cleats 18 as shown, or the holes may be positioned to permit the pins to simply pass outside of the panel 6.

It will be apparent that, by the inclusion of the second end panel 6 to the box shown in Figure 2, and by the addition of a pair of pins 30 to prevent the second end panel 6 from moving outwardly at its top, there can be provided a box having four sides which are held in their proper relation and which may be loaded from the top. Thereafter the box may be closed by the addition of the top panel as has been previously described, and the pins 30 may be removed.

Figure 7:
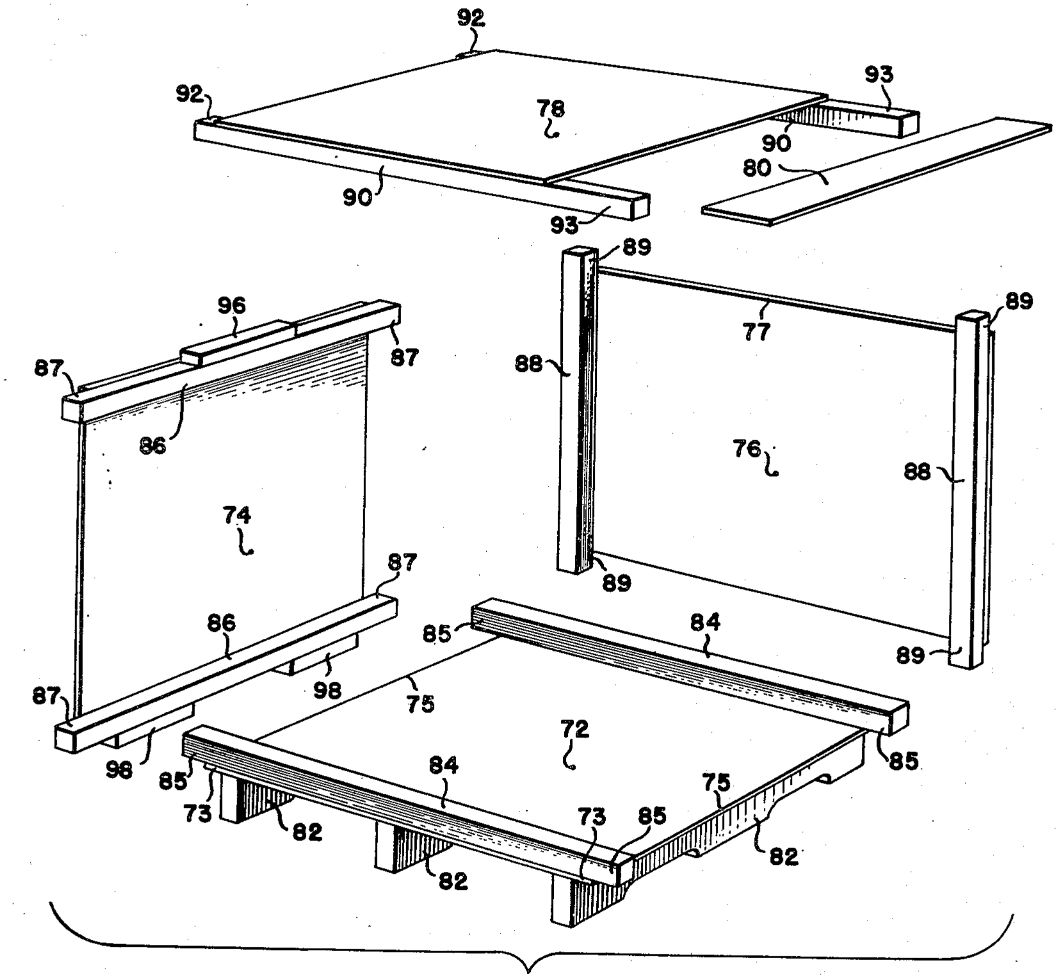
Figure 7 is an exploded view of a box incorporating a third form of the present invention.

The blocks 26 which are shown as being attached to the runners 12 also serve in connection with stacking of the boxes. Attached to the upper surface of each of the upper cleats 16 are the blocks 31. The length of the blocks 31 is equal to the space between the blocks 26. When a pair of boxes of this type are stacked one upon the other, it will be observed, as shown in Figure 3, that the block 31 falls between the blocks 26 and thus prevents sliding of the upper box upon the lower box in a direction parallel to the cleats 16. The blocks 26 may equally well be attached to the lower cleat 16 in so far as the stacking feature is concerned. (This arrangement is shown in Figure 7.) However, the attachment of the blocks 26 to the runners 12 provides support for the side panels 4 when the box is assembled with three sides for end loading as shown in Figure 2.

The depth of the runners, the thickness of the cleats and the thickness of the blocks have been selected, as will be observed in Figure 3, to provide for load to be carried through both the cleats and blocks, and the runners when the boxes are stacked. It will be apparent that, if the runners are made deeper or higher than those shown in Figure 3, the lower cleats 26 of the upper box will not engage the block 31 which is attached to the upper cleat 16 of the lower box, and similarly, the upper cleat 16 of the lower box will not engage the blocks 26 which are attached to the upper box in which case loading of the upper box upon the lower box will be transmitted only through the runners of the upper box bearing upon the top of the lower box.

A saving of material may be effected in the form of the box shown in Figures 1–3 by terminating the bottom panel 2 at the inner edges instead of the outer edges of the cleats 14 and attaching the cleats directly and only to the end portions of the runners 12. Similarly, the panel 6 may be cut back at its upper and lower edges so as to terminate adjacent to the horizontal cleats 14 and 20 when the box is assembled. If separate slats are used in place of the solid panels shown in these figures, it will be apparent that the panel construction will preferably be of this latter form.

By cutting out portions 13 on the lower edges of the runners 12, there may be provided spaces for the entry of the forks of a fork-lift truck. Thus the skid may be lifted by a fork-lift truck approaching from any one of the four sides of the skid.

It will be observed that this box is surrounded at both its top and bottom portions by a succession of cleats. These cleats serve to protect the panels from damage as may occur from bumping or handling, such as, for example, when the boxes are pushed across a floor on their skids by means of a pusher truck.

In the description of box No. 1, the panels 6, which lie across the ends of the runners, have been referred to as end panels, and the panels 4, which lie parallel to or along the sides of the side runners, have been referred to as side panels. This means of distinguishing side panels from end panels will be observed throughout this description.

Figure 4:
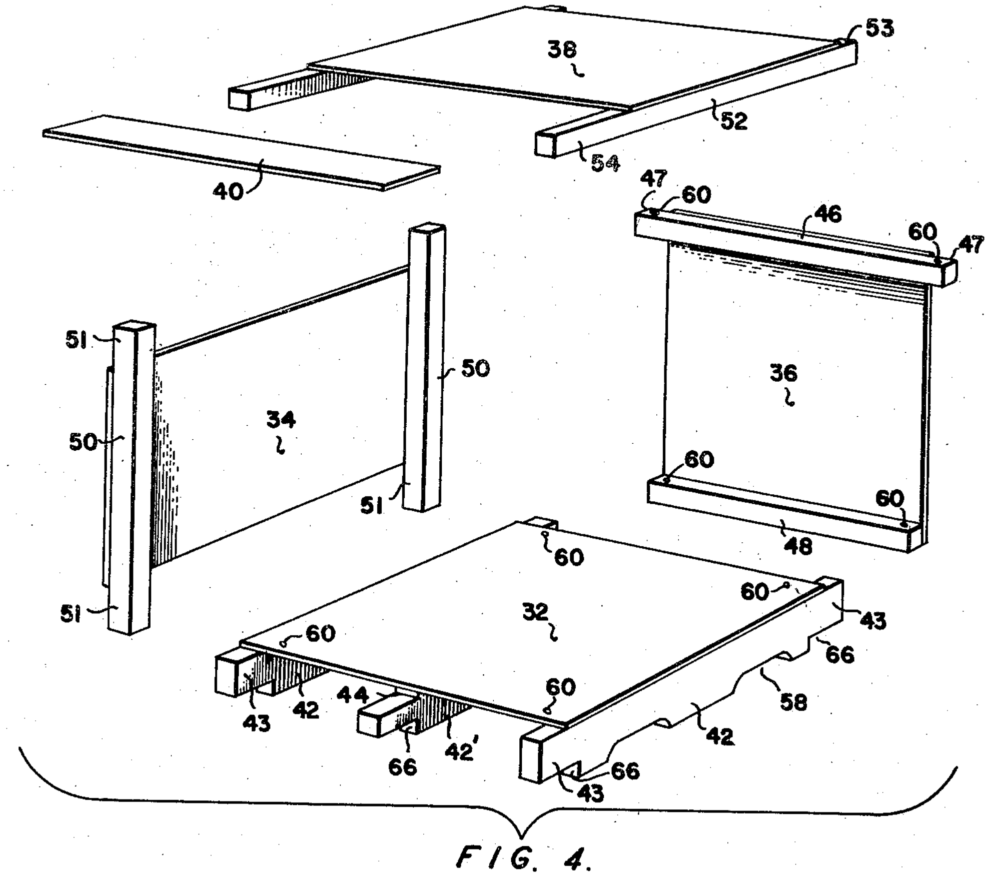
Figure 4 is an exploded view of a box incorporating a second form of the present invention.
Figure 6:
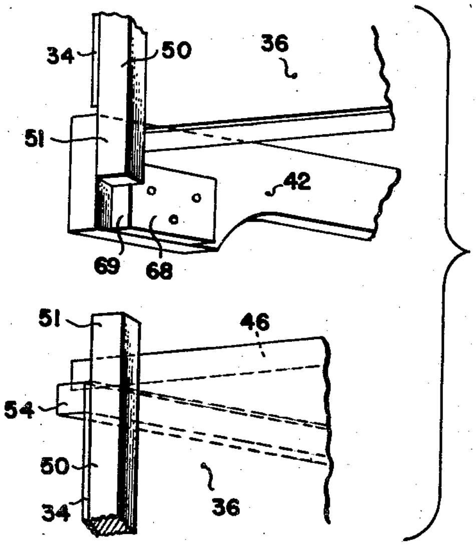
Figure 6 is a fragmentary showing of upper and lower mating corners of the stacked boxes shown in Figure 5.
Figure 5:
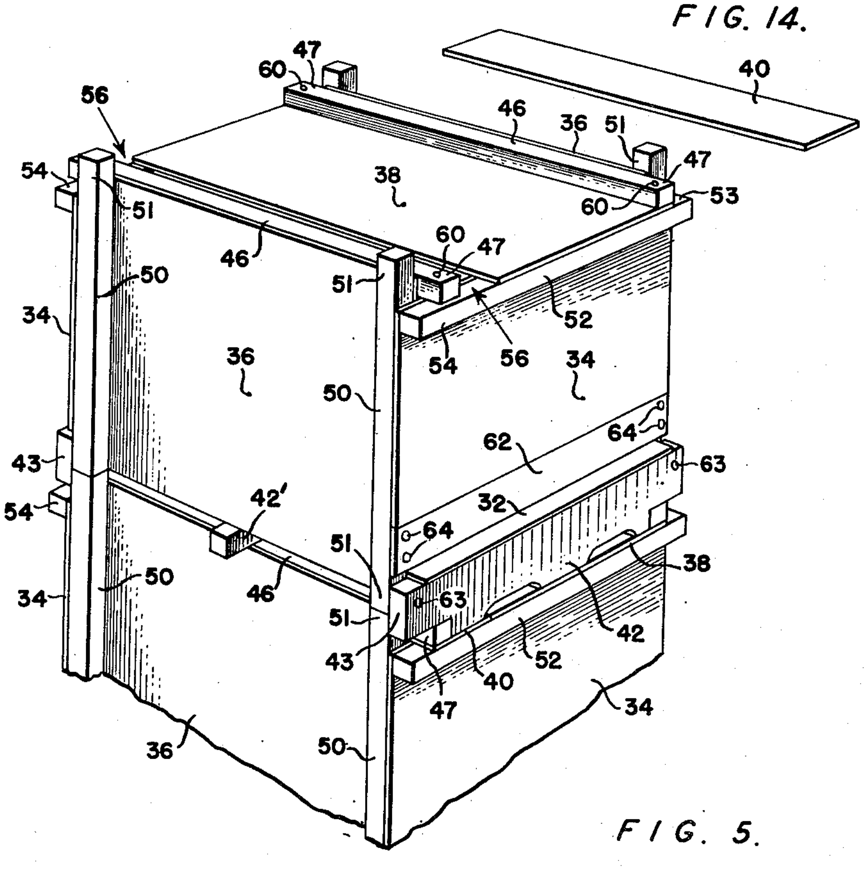
Figure 5 is a perspective view of a pair of boxes of the type shown in Figure 4 assembled and stacked one upon the other.

In Figures 4, 5 and 6 there is shown another form of the invention which will be hereinafter referred to as box No. 2. This box includes six panel members, a base panel 32, two side panels 34, two end panels 36 and a top panel 38. In addition to the top panel there is provided a closing slat 40. The base panel 32 is adapted to be mounted on and rigidly attached to runners 42. If a center runner is provided, such as at 42′, that runner is provided with a cut-out portion 44 which extends underneath the panel 32.

Attached to the inside of each of the end panels 36 adjacent to the upper edge thereof is the horizontally extending cleat 46 which is provided with portions 47 extending beyond the edges of the panel 36. Attached to the inside of each of the end panels 36 and adjacent to the lower edges thereof are horizontally extending cleats 48. The ends of the cleats 48 terminate flush with the edges of the panel 36. A pair of vertically extending cleats 50 are attached to the inside of each of the side panels 34 adjacent to the outer edges thereof. A pair of horizontally extending cleats 52 are attached to the underside of the top panel 38 adjacent to the outer edges thereof. The cleats 50 have portions 51 extending beyond the edges of the side panel 34. The cleats 52 each have extending beyond the panel 38 the portions 53 and 54, the portions 54 being longer than the portions 53 by at least the width of the slat 40.

Box No. 2 may be made from any of the materials from which box No. 1 may be made, the assembly and construction of the box being substantially the same.

To assemble the box, the end panels 36 are placed against the end edges of the bottom panels 32 with the horizontal cleats 48 lying below the panel 32 and extending into the notch 44 which is provided at each and any intermediate runners such as runner 42′. The side panels 34 are then placed into position with the lower ends of the cleats 50 outside of the panels 36 and the lower extending portions 51 of the cleats 50 inside of the extending portions 43 of the runners 42. After the lower portion of the side panels are positioned, the upper portions of the panels are moved inwardly with the upper edge of the panel 34 passing under the extended portions 47 of the cleats 46.

After the bottom, the two sides and the two end panels have been assembled, the top panel 38 may be positioned on top of the box with its cleats 52 lying outside of the side panels 34. This is accomplished by placing the top panel 38 above the box and sliding the extended portions 54 of the top panel cleats 52 under the extended portions 47 of the end panel cleats 46. By passing the extended portions 54 of the cleats 52 under the ends of the cleats 46, the portions 53 of the cleats 52 may be lowered down inside of the cleat 46 of the opposite end panel 36 and, thereafter, by sliding the top panel 38 toward the opposite end panel 36, the extended portions 53 of the cleats 52 may be passed under the extended portions 47 of the cleat 46 of that opposite end panel.

The box with the top panel thus positioned, as shown in Figure 5, is closed by inserting the closing slat 40 in the space generally indicated by the arrow 56 in Figure 5. With the top panel locked into position, there is provided a self-locking box assembly. It will be apparent that the various panels are prevented from moving outwardly between various cleats in a manner similar to that described in connection with box No. 1, and there is thus provided a box assembly which has been assembled without the use of any fastening means other than that hereinafter described in order to secure the closing slat 40 in position.

Box No. 2 has the advantage over box No. 1 in providing a perfectly smooth surfaced pallet or skid by the assembly of the bottom panel 32 with the runners 42. By cutting out portions 58 of the runners on their lower edges, there may be provided spaces for the entry of the forks of a fork-lift truck. Thus the skid may be lifted by a fork-lift truck approaching from any one of the four sides of the skid. After the base panel assembly is loaded, the side end and top panels may be assembled around the base panel to form a finished self-locking box.

In box No. 2 the two ends of one side of the box may be assembled to the base panel to permit side loading of a three sided box in a manner similar to that provided by box No. 1. The end panels 36 will be held upwardly and inwardly by the side panels 34 and the side panel cleats 50. The side panel will be held inwardly at its upper edge by a suitable pin passed through the bore 60, and the end panels will be prevented from spreading apart at their lower portions at the open side of the box by suitable pins passed through the bore 60 in the panel 32 and entering the bore 60 in the cleat 48. The forward or open edges of the end panels 36 will be prevented from dropping downwardly by the portion of the intermediate runner 42′ extending outwardly below the cut-out portion 44. Obviously, if a four sided box is desired so that top loading alone may be accomplished, the second side panel 42 may be put into position and held against outward movement at its upper portion by suitable pins dropped through the bores 60 of the cleats 46.

Box No. 2 has the further advantage in that one or both of its side panels may be provided with a portion 62 separate from the portion 34 which may be attached to the cleats 50 by means of bolts or removable screws 64. This feature is of considerable utility when a box has been loaded with small articles in that, by the removal of the bolts 64 and the panel portion 62, the small parts may be permitted to flow out of the box, thereby facilitating unloading of the box by the provision of an easily employed side dumping feature. After the box is emptied, the panel portion 62 may be replaced and the box reused. To prevent the panel 34 and the cleats 50 from sliding down when the panel portion 62 is removed, pins 63 may be provided passing through the runners 42 and into the cleats 50 to hold the cleats and panels in proper position.

The runners 42 and 42′ are provided at the undersides of their outer ends with the cut-out portions 66. When No. 2 boxes are stacked one upon the other, as shown in Figure 5, the cut-out portions 66 of the runners of the top box will engage the ends of the cleats 52 of the bottom box, and the upper ends of the cleats 50 of the bottom box will fall behind and engage the end portions 43 of the runners of the top box. Thus there is provided a rigid interlocking between the parts of the two boxes permitting the boxes to be stacked one upon another with no possibility of the top box sliding out of its position on top of the lower box.

In the box shown in Figure 5, the cut-out portions 66 of the runners 42 have been made of a depth identical to the thickness of the cleats 46, and the lengths of the cleats 50 extending above and below the side panels 34 have been selected so that the upper end of the cleat 50 of the lower box in Figure 5 engages the lower end of the cleat 50 of the upper box in Figure 5. It will be apparent that it is not necessary for these vertical cleats 50 to engage each other, nor is it necessary that the runner engage the top surface of the lower box. Such proportions are preferable, however, to accomplish the most desirable load distribution when boxes are stacked.

In Figure 6 there is shown an alternate means for providing interlocked stacking of box No. 2. A block 68 is attached to the inside of each of the outer runners 42 adjacent to the outer ends thereof. In this form of box it is unnecessary to provide the cut-outs 66 in the runners. When one box is stacked upon another box, the upper ends of each of the cleats 50 of the lower box, as shown in Figure 6, will pass upwardly beside and in engagement with the runner 42 and the surface 69 of the block 68. Each of the four cleats 50 being thus engaged on two of its sides serves to prevent any possible motion between the upper and lower boxes. In this form of stacking, however, the entire weight of the upper box is carried upon the extended portions 47 of the cleats 46 unless the cleats 50 are proportioned so as to provide engagement of the upper ends of the cleats 50 of the lower box with the lower ends of cleats 50 of the upper box and thus carry some or all of the load.

The block 68 may be replaced by slats extending transversely of the runners 42 and attached to the undersides of the runners in such a position as to engage the same sides of the cleats 50 as is engaged by the surface 69 of the block 68. In this latter stacking arrangement, the transverse slat would lie on top of the cleat 46 for its entire length.

Another possible alternate stacking arrangement would be to bevel, incline or notch the upper and lower ends of the cleats 50 so that the upper ends of the cleats of the lower box would mate or nest with the lower ends of the cleats of the upper box. While this arrangement may not provide as positive a stacking interlock as the previously described arrangements, it would have the advantage of requiring less material and of being easier to produce.

The form of the invention described as box No. 2 and shown in Figures 4 and 5 has the further advantage in being susceptible to extension of the vertically extending cleats 50. A crate of this type has considerable utility in applications where the crate may be adapted to serve also as a stand or table for the article to be contained within the crate when the article is removed from the crate. For example, a camp stove may be packed in this type of crate, and the vertically extending cleats 50 may be extended below the crate for any desired distance. When it is desired to carry the stove the stove would be packed within the crate and, when it is desired to set up the stove, the stove may be removed from the crate, the crate reassembled, thereby providing a support for the stove, and the stove placed thereupon.

In this form of the invention the end panels 36 may be shortened in width so as not to fall under the vertical cleats 50, the side panels 34 may be shortened in height so as not to fall under the cleats 52 and the top panel 38 and the closing slat 40 may be shortened so as not to extend under the cleats 46. In the event that individual slats are employed in place of solid panels, this is the obvious form of construction.

Figure 8:
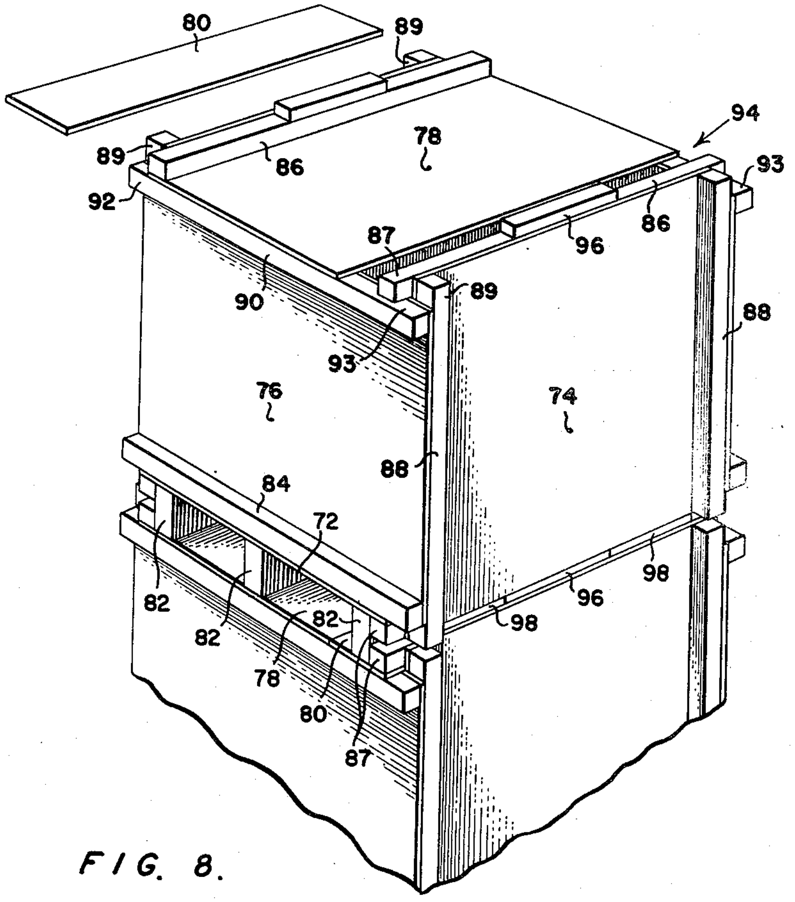
Figure 8 is a perspective view of a pair of boxes of the type shown in Figure 7 assembled and stacked one upon the other.

In Figures 7 and 8 there is shown a form of the invention which will be hereinafter referred to as box No. 3. This box includes six panels, a base panel 72, two side panels 74, two end panels 76 and a top panel 78. In addition to the top panel there is provided a closing slat 80. The base panel 72 is adapted to be mounted rigidly upon runners 82. Mounted on top of the base panel 72 and attached thereto at the outer edges thereof are a pair of cleats 84. A pair of horizontally extending cleats 86 are attached to the inside of each of the side panels 74 adjacent to the upper and lower edges thereof. A pair of vertically extending cleats 88 are attached to the inside of each of the end panels 76 adjacent to the outer edges thereof. A pair of horizontally extending cleats 90 are attached to the underside of the top panel 78 adjacent to the outer edges thereof. The cleats 84 have portions 85 extending beyond the edges of the base banel 72 and the base panel 72 has the portions 73 extending outside of the runners 82. The cleats 86 have the portions 87 extending beyond the edges of the panel 74. The cleats 88 have the portions 89 extending beyond the edges of the panel 76 and the cleats 90 each have extending beyond the panel 78 the portions 92 and 93, the portion 93 being longer than the portion 92 by at least the width of the slat 80.

Box No. 3 may also be made of any of the materials described in connection with Box No. 1.

To assemble box No. 3, the two side panels are brought into position with the cleats 86 passing below the bottom panel 72 and with the panel 74 engaging the edges 75 of the panel 72. With the side panel held in this position, the end panels 76 may be positioned with the lower portion of the panel inside of the cleat 84 and the lower portion of the cleats 88 passing outside of the panels 74. With the lower portion of the panel 76 in this position, the upper portion may be then rocked inwardly with the upper edge 77 of the panel 76 passing below the extended portions 87 of the cleats 86.

After the bottom, the two side and the two end panels have been thus assembled, the top panel 78 may be positioned on top of the box with its cleats 90 lying outside of the upper edges 77 of the end panel. This is accomplished by placing the top panel on top of the box and sliding the extended portions 93 of the top panel cleats 90 under the extended portions 87 of one of the upper cleats 86 of the side panel 74. By passing the extended portions 93 of the cleats 90 under the ends of the cleat 86, the portion 92 of the cleat 90 may be lowered down inside of the cleat 86 of the opposite side panel 4 and, thereafter, by sliding the top panel toward the opposite side panel 74, the extended portions 92 of the cleats 90 will pass under the extended portions 87 of the cleat 86 of that side panel.

A box with the top panel thus positioned is locked by inserting the closing slat 80 in the space generally indicated by the arrow 94 in Figure 8. With the top panel locked in position there is provided a self-locking box assembly similar to boxes No. 1 and No. 2.

Attached to the upper cleats 86 of each of the side panels 74 is a block 96, and blocks 98 are attached to the lower cleats 86 of the side panels 74. The length of the blocks 96 is equal to the spacing between the blocks 98, and thus there is provided interlock stacking of box 3 in a manner similar to that provided for box No. 1.

If it is desired to provide a three sided box for loading of box No. 3, an arrangement of boxes and pins similar to that described in connection with box No. 1 may be employed, and the blocks 98 will be attached to the runners 82 rather than the cleat 86.

In the form of box shown in Figures 7 and 8, the bottom panel 72 need not necessarily pass under the cleat 84 and the cleat 84 may in that case be attached directly to the runners 82. Similarly, the end panels 76 need not extend inside of the cleats 84 and 90. It is sufficient that these cleats are engaged by the cleats 88. The side panel 84 need not extend inside of the cleats 88. Engagement of the cleats 88 with the cleats 86 will serve to hold the box in assembled form, and similarly, the top panel need not extend under the cleats 86. The extension of the top cleats 90 is sufficient to lock the box together. This is the obvious arrangement of the box when individual slats are employed in place of the panels as shown.

Figure 9:
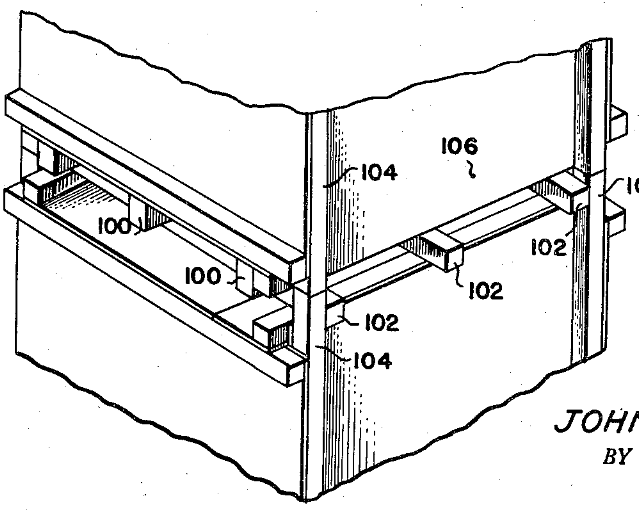
Figure 9 shows a modified form of the box shown in Figures 7 and 8.

In Figure 9 there is shown a pair of stacked boxes of the form of box No. 3 being provided with an alternate form of runner. In this figure the runners 100 attached to the bottom panel of the box are of reduced thickness, and passing below the runners 100 transversely thereto are the runners 102. This type of runner assembly provides for entry of fork-lift truck forks from any one of the four sides of the box, and provides interlock stacking by means of the engagement of the upper ends of the vertical cleats 104 of the lower box with the end portions of the runners 102 of the upper box. In order to provide locking between the stacked boxes in a direction parallel to the runners 102, it is necessary that the vertically etxending cleats 104 of the top box are shortened and the vertically extending cleats of the bottom box are lengthened sufficiently that the upper ends of the vertical cleats of the lower box will engage the panel 106 of the upper box or alternately to provide bevelled or otherwise interlocking ends of the cleats 104 of the upper and lower boxes.

When this skid construction is employed in connection with box No. 2, it is not necessary that the vertically extending cleats be changed in length. The out-board position of the extended portion 43 of the runner is such as to provide, in conjunction with a transversely extending runner portion similar to that shown at 102 in Figure 9, a completely interlocked arrangement with the upwardly extending portion of the vertical cleats of the lower box.

Figure 10:
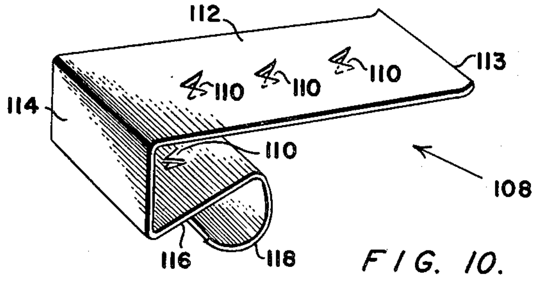

In Figure 10 there is shown generally at 108 a clip which, as will be hereinafter described, may be employed to hold a closing slat in position on an assembled box. The clip is formed from a strip of spring steel and has an extended flat portion 112 terminating in a slightly turned-up end 113. The portion 114 is formed at substantially right angles to the portion 112, and the portion 116 is formed at an angle less than 90° with respect to the portion 114. The portions 116 and 112 are provided with inwardly extending prongs 110 which are pressed in the clip. The generally curved portion 118 is provided to permit pulling down the portion 116 in order to open the space between the portion 116 and the portion 112 to provide for positioning of the clip upon the box as will be hereinafter described.

Figure 11:
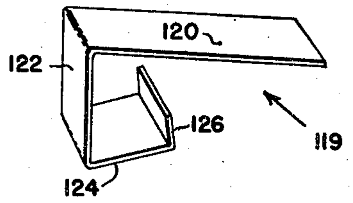
Figures 10 and 11 are perspective views of locking clips which are adapted to be employed in the assembly of the various boxes.

In Figure 11 there is shown generally at 119 an alternate and preferable form of clip which is formed from a strip of steel, preferably having some spring qualities and having the portion 120, the portion 122 at right angles to the portion 120, the portion 124 formed at less than 90° with respect to the portion 122 and the portion 126 formed at substantially right angles to the portion 124.

Figure 12:
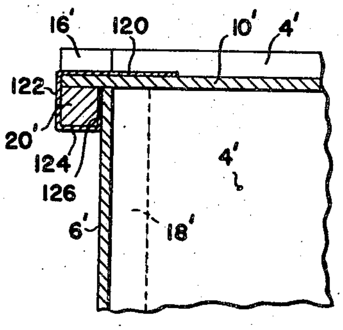
Figure 12 is a fragmentary transverse section of a box of the type shown in Figure 3.

This type of clip is shown in Figure 12 in the position it will assume in an assembled box when it is serving to retain the closing slat in position on the lid of the box. Figure 12 is a fragmentary transverse section of the box of the type shown in Figure 3, the section being taken through the closing slat which is shown in section as 10′ in Figure 12. Behind the closing slat there appears the side panel 4′ and the cleat 16′. Below the closing slat there appears in section the cleat 20′ and the end panel 6′. The vertical cleat 18′ lies back of the side panel 4′.

When the clip shown in Figure 11 is used to retain the closing slat of the box, as shown in Figure 12, the portion 120 of the clip lies on top of the closing panel 10′. The portion 122 of the clip engages the side of the cleat 20′. The portion 124 of the clip engages the bottom surface of the cleat 20′ and the turned-up portion 126 of the clip springs upwardly between the cleat 20′ and the end panel 6′. It will be apparent that the closing slat 10 is thereby prevented from moving either sideways or upwardly, thus being held permanently retained between the top panel and the adjacent horizontal cleat.

The clip shown at 108 in Figure 10 may be similarly employed and will be held in position by the inwardly extending prongs 110 which will pierce the surface and thereby engage the closing slat 10′ and the bottom of the cleat 20′. While the clip has been shown in Figure 12 as being employed with a No. 1 box, it will be apparent that either of the clips may be equally well employed in connection with boxes No. 2 or No. 3.

Figure 13:
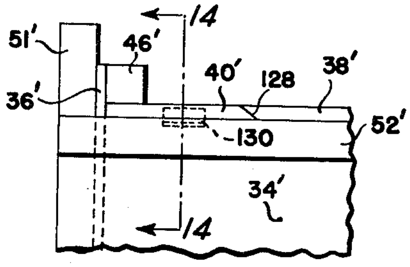
Figure 13 is a fragmentary side elevation of a box of the type shown in Figure 5.
Figure 14:
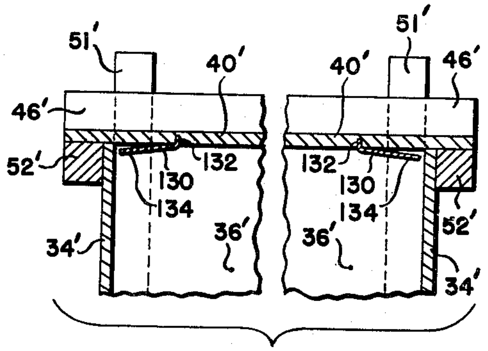
Fig. 14 is a view taken on the trace 14—14 of Figure 13.

Figures 13 and 14 show an alternate means for retaining the closing slat in position in boxes No. 2 and No. 3. Figure 13 shows a fragmentary side elevation of the box shown in Figure 5 showing a side panel 34′, a horizontal cleat 52′, a top panel 38′, the upper extension of a vertical cleat 51′, the end of a horizontal cleat 46′ and an end panel 36′. In Figure 13 the closing slat 40′ and the top panel 38′ are bevelled to provide for inclined engagement between the slat and the panel as shown at 128.

It will be apparent that, due to the formation of the edges of the closing slat 40′ of the top panel 38′ as shown at 128, and the presence of the cleat 46′ above the closing slat 40′, the closing slat 40′ must be positioned by entering it from the side of the box and pushing it beneath the cleat 46′ across the top of the box to close the box. The closing slat 40′, as shown in Figures 13 and 14, is provided on its underside with a pair of clips 130 which are driven into the slat as indicated at 132 and extend downwardly below the slat as shown at 134. To position the slat 40′ when the slat is provided with clips 130, the slat is entered from one side of the box as previously described. The first clip to enter will have to be held upwardly against the slat as it is entered over the side panel 34′. The clip adjacent to the opposite end of the slat will be pressed upwardly by the cleat 52′ as the slat is pushed into position over the box. When the slat is completely pushed into the position as shown in Figure 14, the ends 134 of the two clips will spring downwardly and any attempt to slide the slat 40′ one way or the other will be resisted by the engagement of the end 144 of the clip against the inside surface of a side panel 34′. It will be apparent that the inclined engaging surfaces between the top panel and the closing slat, as shown at 128, may be replaced by a tongue and groove arrangement or various other arrangements providing for similar locking of the closing slat by the top panel.

Figure 15:
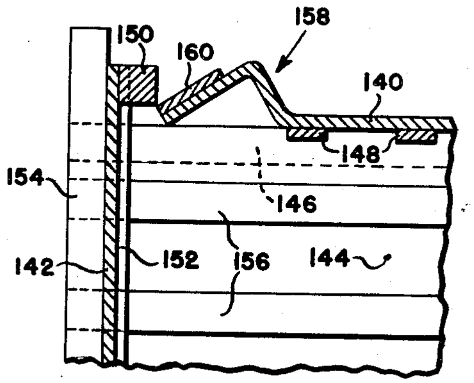
Figure 15 is a fragmentary transverse section of a box of the type shown in Figure 5 showing an alternate form of construction of the box parts.

In Figure 15 there is shown a fragmentary transverse section of a box employing fiber or other somewhat flexible material for the panels of the box. Figure 15 shows a box of the type described as box No. 2 having a top panel 140, an end panel 142 and a side panel 144. The top panel is attached to a pair of top panel cleats 146 and is reenforced by transverse slats 148 which pass between the top panel cleats 146 and to which the top panel 140 is attached. Similarly, the end panel 142 is attached to a pair of horizontal cleats 150 and to transverse slats 152. The side panel 144 is attached to a pair of vertical cleats 154 and is reenforced by transverse slats 156. When the top panel is assembled, the portion of the panel shown generally at 158 is not stitched or otherwise attached to the top panel cleats 146, thereby forming a part equivalent to the closing slats heretofore described and permitting the assembly of the box. After the box is assembled, the portion 158 is folded, as shown in Figure 15, and the reenforced end portion 160 is inserted below the cleat 150 to lock the box. After the reenforced end 160 of the top panel is inserted below the cleat 150 and the entire portion is pressed flat against the top panel cleats 146, the portion 158 of the top panel may be fastened to the top panel cleats 146 by means of a clip, as shown in Figure 11, by nails, staples or other suitable fastening means. While this form of fiber box construction is shown in Figure 15 as being employed in a No. 2 box, it will be apparent that this type of construction may be equally well employed in a No. 1 or No. 3 box.

As previously stated, any of the boxes disclosed herein may be modified by employing a panel comprising a plurality of individual slats rather than a solid panel as shown in the figures. For loading certain types of articles this individual slat construction may be advantageously employed to not only conserve materials but also to provide blocking or positioning of the articles being loaded. For example, any reasonably flat articles having extended end flanges or end portions such as may extend between and be engaged by adjacent slats, may be loaded in boxes of any of the three types disclosed herein having opposite panels formed of properly spaced slats.

Another advantage of this type of prefabricated box construction is that load blocking members may be attached to the various panels and accurately located thereon during the assembly of the panel itself. Thus there can be provided a completely prefabricated box assembly which may include all necessary load blocking members, and which may be rapidly and easily assembled around the articles to be loaded, or, alternately, may be closed after the articles have been loaded into the box, and the assembly accomplished without the use of any tools other than locking clips shown in Figures 10 or 11.

It will be apparent that any panel and any cleat may be made of any individually desired dimension to provide adequate strength as required for that portion of the box. For example, machinery may be bolted to the base member which would be made of relatively heavy material to mount the machine and the sides, ends and top of the box could then be made of relatively light material to protect the machine. It should also be noted that, when the panels are composed of a plurality of slats, the slats forming the various sides of the box are at right angles to the slats of adjacent sides. This arrangement assures rigidity of the box and avoids possibility of the box parallelogramming. These and other modifications may be made in the embodiment of the invention disclosed herein without departing from the scope of the invention as set forth in the following claims.

What is claimed is:

1. A knock-down box comprising a plurality of side forming members, each of said side forming members including a panel and a pair of cleats attached to the panel adjacent to opposite edges thereof, said members being constructed and arranged to be assembled into a box in which each of said members is held in position by adjacent members and in which the cleats of four of the members are positioned inwardly of their associated panel and in which the cleats of at least one other of the members are positioned outwardly of their associated panel, the inwardly positioned cleats which lie on the same side of the box as outwardly positioned cleats lie in the same plane therewith and with the ends of the inwardly positioned cleats abutting the outwardly positioned cleats, one of said members including a separate panel portion adapted to be secured to the box after the box is assembled to permit assembly of the box and to retain the box in its assembled position.

2. A knock-down box comprising a plurality of side forming members, each of said side forming members including a panel and a pair of cleats attached to the panel adjacent to opposite edges thereof, said members being constructed and arranged to be assembled into a box in which each of said members is held in position by adjacent members and in which the cleats of four of the members are positioned inwardly of their associated panel and in which the cleats of at least one other of the members are positioned outwardly of their associated panel, the inwardly positioned cleats which lie on the same side of the box as outwardly positioned cleats lie in the same plane therewith and with the ends of the inwardly positioned cleats abutting the outwardly positioned cleats, and means supported from the bottom panel of the box for supporting two opposing vertically extending side panels of the box during assembly of the box, one of said members including a separate panel portion adapted to be secured to the box after the box is assembled to permit assembly of the box and to retain the box in its assembled position.

3. A knock-down box comprising a plurality of side forming members, each of said side forming members including a panel and a pair of cleats attached to the panel adjacent to opposite edges thereof, said members being constructed and arranged to be assembled into a box in which each of said members is held in position by adjacent members and in which the cleats of four of the members are positioned inwardly of their associated panel and in which the cleats of at least one other of the members are positioned outwardly of their associated panel, the inwardly positioned cleats which lie on the same side of the box as outwardly positioned cleats lie in the same plane therewith and with the ends of the inwardly positioned cleats abutting the outwardly positioned cleats, and means including vertically extending bores in said cleats at at least each top corner of the box passing through the ends of horizontally extending cleats adapted to receive pins for holding adjacent members of a portion of the total number of said members in assembled position to permit loading of a box with at least one of said members not assembled thereto, one of said members including a separate panel portion adapted to be secured to the box after the box is assembled to permit assembly of the box and to retain the box in its assembled position.

4. A knock-down box comprising a base member, a pair of side members, a pair of end members, and a top member, each of said members comprising a panel and a pair of cleats attached to the panel adjacent to opposite sides thereof, said members being constructed and arranged to be assembled into a box in which each of said members is held in position by adjacent members and in which the cleats of said pair of side members are positioned inwardly of their associated panels and the cleats of said pair of end members are positioned outwardly of their associated panels, the inwardly positioned cleats of each of the side members lie on the same plane as the outwardly positioned cleats of the end member adjacent thereto with the ends of the inwardly positioned cleats abutting the outwardly positioned cleats of their adjacently positioned end member, said top member having inwardly turned cleats extending outwardly of the inwardly turned cleats of said side members and inwardly of the outwardly turned cleats of said end members and including a separate panel portion adapted to be secured to the cleats of the top member after the box is assembled to permit assembly of the box and to retain the box in an assembled condition.

References Cited in the file of this patent

UNITED STATES PATENTS

| | | |
|---|---|---|
| 466,234 | Hauck | Dec. 29, 1891 |
| 740,213 | Averill | Sept. 29, 1903 |
| 1,193,567 | Lane et al. | Aug. 8, 1916 |
| 1,309,341 | Ritter | July 8, 1919 |
| 1,565,993 | Fitzpatrick | Dec. 15, 1925 |
| 1,587,781 | Lane et al. | June 8, 1926 |
| 2,003,856 | Gimbel | June 4, 1935 |
| 2,410,216 | Insoll | Oct. 29, 1946 |
| 2,579,685 | Loose | Dec. 25, 1951 |

FOREIGN PATENTS

| | | |
|---|---|---|
| 882,262 | France | Feb. 22, 1943 |
| 898,491 | France | July 3, 1944 |